2 Sheets--Sheet 1.

W. T. FARRE.

Machines for Bending Tubing.

No. 5,581. Reissued September 30, 1873.

Witnesses.

John M. Reid

B. S. Clark.

Inventor.

W. T. Farre

AM. PHOTO-LITHOGRAPHIC Co. N.Y. (OSBORNE'S PROCESS)

2 Sheets--Sheet 2.

W. T. FARRE.

Machines for Bending Tubing.

No. 5,581. Reissued September 30, 1873.

Witnesses.

John M. Reid

B. S. Clark

Inventor.

W. T. Farre

AM. PHOTO-LITHOGRAPHIC Co. N.Y. (OSBORNE'S PROCESS.)

UNITED STATES PATENT OFFICE.

WILLIAM T. FARRE, OF MONTREAL, CANADA.

IMPROVEMENT IN MACHINES FOR BENDING TUBING.

Specification forming part of Letters Patent No. 133,636, dated December 3, 1872; reissue No. 5,581, dated September 30, 1873; application filed June 30, 1873.

DIVISION A.

*To all whom it may concern:*

Be it known that I, WILLIAM THEODOR FARRE, of the city of Montreal, district of Montreal, Province of Quebec, Dominion of Canada, have invented a Machine for Making Curved Tubes of Soft Metal, of which the following is a specification:

The invention consists, first, of an improved machine, which, by a kind of pressing, something analogous to the spinning of sheet metal in the lathe, reduces the thickness of a previously-cast tube, the said tube having been cast with a surplus of metal on the places where the outside of the curve is desired.

When such a casting is cut at the point where the curve is intended to be, it shows in cross-section a gradually-increasing thickness of metal on both sides from the place where the inside of the curve would be, and round to that place where the outside would be, the length and the radius of the curve being determined by the length and the mass in the thickened part of the casting.

Figure 1:
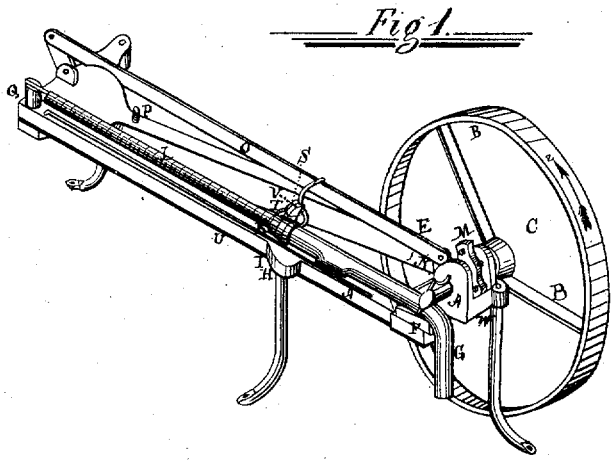
Figure 2:
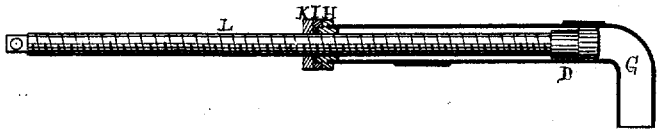
Figure 4:
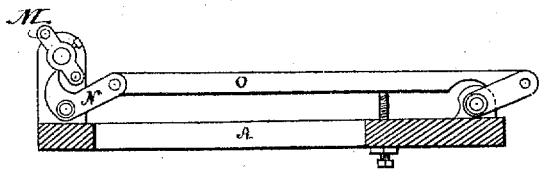
Figure 3:
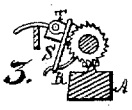
Figure 5:
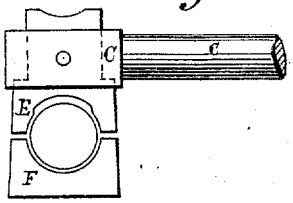
Figure 6:
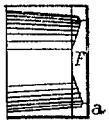
Figure 7:
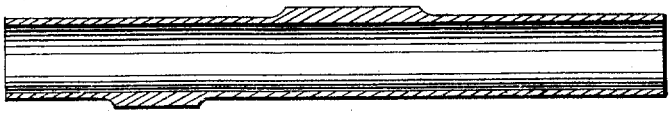
Figure 8:
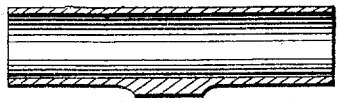

Figure 1 is a perspective view of the machine. Fig. 2 is a vertical section through the center of the feed-screw L, ratchet combination K I H, mandrel D, and the partly-formed tube G. Fig. 3 is a ratchet combination, seen from behind, and a section of a part of the frame and the lifting-bar on the line U. Fig. 4 is a side elevation of the dog, bell-crank lever, lifting-bar, and a section of the frame on the line W. Fig. 5 is a side elevation of axle and dies, seen from the fore end of the machine. Fig. 6 is the lower die, seen from above. Figs. 7 and 8 are sections of castings in the center line.

The machine consists of a frame, A, Fig. 1, provided with two uprights, in which the axle C is hung. In the sliding stud Q, at the opposite end of the machine, the feed-screw and mandrel L D are hinged in such a manner that the head of the feed-screw or mandrel D is resting in the lower die F. The stud Q is made sliding, for the purpose of adjusting the mandrel lengthwise to the desired position in the die F. When the axle, with the upper die E, (or dies, as the die-bar has a die at each end,) is moved in the direction of the arrow Z a small part of its revolution from the position shown in Fig. 1, it will stand, with its stroke nearly finished, directly over the front of the lower die, as seen in Fig. 5.

The device for imparting feed-motion, Figs. 3 and 4, consists of a dog, M, provided with two lugs, and fastened on the axle C. This dog actuates the bell-crank lever N, which puts the lifting-bar O in motion. On the feed-screw L the feed-block H fits loosely over the top of the treads. Back of H comes the ratchet-wheel nut K, and between them the pawl-carrier I is fitted, as shown in Fig. 2. The feed-block H is provided with two studs, which embrace a flange cast on the frame-piece, and also with a wire, R, the latter holding the one loop of the rubber spring S, Fig. 3; the other loop of the spring S is lying around the pawl T. This spring S throws the pawl-carrier back, when the lifting-bar O falls down. The feed is intermittent, only feeding when the dies are not working. P, the adjusting-screw, serves to limit the descent of bar O, and thus to regulate the degree of feed. The working faces of the upper dies are slanted or beveled slightly, so that no scraping action can take place; but the faces will work on the lead or other metal in the manner of a burnisher; consequently they ought to be well hardened and polished. The lower die commences its work from the line on either side of the tube, where the upper dies stop working, and works from there downward on either side of the tube for about sixty degrees. The remaining sixty degrees, more or less, in the bottom of the die needs no working, and the working-rim on the lower die is, in this place, hollowed slightly down to prevent it from working. The working rim in the lower die consists in a convex rim lying inside in the front end of the die. This rim is running all along the front lip of the die, and is convex in its cross-section. It is not separate from the die, but formed in the metal of the die. It is marked *a* on Fig. 6. This rim is of course the die proper, and is of the size of the tube desired. The tube-casting, which is something larger in the thickened part, cannot consequently come down until the upper die forces it down, and in doing this both dies act upon and displace the eccentric portions of the tube, reducing it thus to a tube with walls of equal thickness; but as there was more metal to stretch out on the upper part of the tube than on the sides, and nothing at all underneath, the tube will form a curve downward, said curve being proportionate to the excess of the mass of surplus metal in the casting.

To work the machine, insert a casting from the front end of the machine around the mandrel D, until its inner end enters into its serrated seat in the feed-block H. Get the thickest of the thickened part above, oil the casting, put the machine in motion, either by a belt, a coupling, or a crank in the direction of the arrow, Fig. 1, and let it work until the curve is formed. When there is another curve to form, as in a stench-trap, withdraw the half-finished tube, turn it, and insert it again; the upper dies will then play inside in the curve already finished.

I claim as my invention—

1. The combination, with the die F and mandrel D, of the revolving plate-die E, the construction and combination of the parts, and the mode of operation of the combination, being substantially as specified.

2. The combination, with the threaded mandrel-stem L, and the lifting-bar O, of the intermediate mechanism, through which feed-movement is imparted to the tube, substantially as described.

W. T. FARRE.

Witnesses:
JOHN M. REID,
BEN. S. CLARK.